United States Patent [19]
Gunther

[11] 3,847,570
[45] Nov. 12, 1974

[54] ABSORPTION OF $SO_2$ FROM A DILUTE GAS AND DESORPTION AT A HIGHER CONCENTRATION IN A STRIPPING GAS AT SUB-ATMOSPHERIC PRESSURE

[75] Inventor: Arnold Gunther, West Orange, N.J.

[73] Assignee: Treadwell Corporation, New York, N.Y.

[22] Filed: Apr. 30, 1973

[21] Appl. No.: 355,809

Related U.S. Application Data

[63] Continuation-in-part of Ser. No. 152,232, June 11, 1971, abandoned, which is a continuation-in-part of Ser. No. 132,752, April 9, 1971, abandoned, which is a continuation-in-part of Ser. No. 860,183, Aug. 13, 1969, abandoned.

[52] U.S. Cl..................................... 55/73, 55/94
[51] Int. Cl............................................ B01d 53/14
[58] Field of Search............... 55/48, 51, 68, 70, 71, 55/73, 84, 93, 94, 233

[56] References Cited
UNITED STATES PATENTS

| | | | |
|---|---|---|---|
| 1,901,416 | 3/1933 | Schroeder............................. | 55/73 |
| 3,073,092 | 1/1963 | Ancrum et al......................... | 55/89 |
| 3,225,519 | 12/1965 | Stotler.................................... | 55/93 |
| 3,370,402 | 2/1968 | Nakai et al. ........................... | 55/94 |
| 3,511,027 | 5/1970 | Roberts et al. ....................... | 55/73 |
| 3,528,220 | 9/1970 | Warner et al.......................... | 55/89 |

*Primary Examiner*—Charles N. Hart
*Attorney, Agent, or Firm*—Robert Ames Norton; Saul Leitner

[57] ABSTRACT

$SO_2$ is absorbed from a gas, such as, for example, a stack gas from a power plant burning high sulfur fuel, to form a water solution of $SO_2$, the absorption being at a pressure approximating one atmosphere. From the water solution the $SO_2$ is desorbed in a stripper with a fixed gas at a ratio to $SO_2$ not $>$ 10/1. Such gases are air or a reducing gas, such as methane. Stripping is at sub-atmospheric pressures and both absorber and stripper are in multiple stages, such as two, with interconnection in which stripper and absorber are paired, stripped liquid in the first stage of the stripper being used as the absorbing liquid in the first stage of the absorber and, similarly, for the second or other stages. The paired multiple-stage absorber and stripper operation permits operating reliably with smaller amounts of stripping gas, for example, in the case of a reducing gas such as methane, without a substantial excess over that theoretically required for producing sulfur from the $SO_2$. The reduced amounts of stripping gas permit producing higher concentrations of stripped $SO_2$. If desired, the stripping gas can be expanded from ambient to the sub-atmospheric pressure at which it is used in expanders and can produce at least part of the power required for compressing the stripped gas back to ambient pressures.

2 Claims, 9 Drawing Figures

FIG. 5A

POWER PLANT FLUE GAS
t = 350° F
FLOW: 1,750,000 scfm.

| GAS COMPOSITION (% BY VOL.) | MOLAR COMPOSITION lb. mol./hr. |
|---|---|
| $CO_2$: 12.67% | 35,096 |
| $N_2$: 75.15% | 208,165 |
| $O_2$: 3.00% | 8,130 |
| $H_2O$: 8.98% | 24,875 |
| $SO_2$: 0.20% | 554 |
| | 277,000 lb. mol./hr. |

WATER SPRAY: 21,700 lb. mol./hr.

130° F w.b.

MAIN GAS BLOWER 6000HP

PARTICULATE MATTER SCRUBBER

80°F

75°F

32 — STEAM 35,800 GPM FROM CLT

85°F  $H_2O$: 20  $CO_2$: 40  $SO_2$: 16

130°F sat.

wb: 130°F

SETTLER

CONDENSER 88 mmhg

75°F 4000 GPM $H_2O$: 4900  $SO_2$: 16  $CO_2$: 40

29  110°F

125°F

FLASH POT 88.6 mmhg  28
120°F

120°F

WATER MAKE-UP: 1200 GPM

HOT WELL  31

TO CLT

| FIG. 5A | FIG. 5B | FIG. 5C | FIG. 5D |
|---|---|---|---|
| | | | |

ABSORPTION OF SO₂ FROM A DILUTE GAS AND DESORPTION AT A HIGHER CONCENTRATION IN A STRIPPING GAS AT SUB-ATMOSPHERIC PRESSURE

This application is a continuation-in-part of Ser. No. 152,232 filed June 11, 1971; which is a continuation-in-part of Ser. No. 132,752 filed Apr. 9, 1971; and which is a continuation-in-part of Ser. No. 860,183 filed Aug. 13, 1969. All of the above applications are now abandoned.

BACKGROUND OF THE INVENTION AND RELATED APPLICATIONS

In this section, which sets forth the prior art background, all applications referred to are assigned to the assignee of the present application. Also, some of the statements require consideration of curves in the first four figures of the drawings, the brief description of the drawings being set forth further below.

There are many sources of relatively dilute $SO_2$-containing gases, such as, for example, tail gases from contact sulfuric acid plants, combustion gases from high sulfur fuel, and the like. These gases, if directly discharged into the atmosphere, contribute seriously to air pollution, and increasingly stringent laws are requiring drastic reductions in $SO_2$ content of gases discharged to the atmosphere. This has presented problems, which have been approached, in the case of combustion gases, in two general ways. One involves the use of low sulfur fuels, such as low sulfur coal or oil or even natural gas. While this approach is effective and is in current use in many power plants, the fuels are much more costly than high sulfur fuels, and so cost of electric power increases. Also, the amounts of certain low sulfur fuels, such as natural gas, restrict its use considerably. In general the special fuel approach may well be only a temporary stopgap over the next few years and involves the drawback of higher fuel costs.

The second approach, which is the only feasible one in the case of some of the less dilute gases, such as tail gases from contact sulfuric acid plants, gases from sulfide ore or concentrate roasting and the like, involves removing, and preferably recovering, at least most of the $SO_2$. The more concentrated gases present an even more serious pollution problem because the $SO_2$ content has to be reduced by a larger factor than with stack gases. It is not always necessary, particularly in connection with stack gases for power plants, to remove every last bit of sulfur dioxide. If the concentration is reduced drastically, for example by a factor of about ten with stack gases, the remaining concentration is so low that it is acceptable for discharge into the atmosphere.

A number of methods have been proposed for removing part or nearly all of the $SO_2$. Many of these involve absorption in a suitable liquid, of which water or a very dilute solution of $SO_2$ in water is the most attractive economically. It is with this general class of procedure that the present invention deals.

Several ways of stripping the absorbed $SO_2$ have been described. One of them is in the Roberts U.S. Pat. No. 3,511,027. It has also been proposed in the Schroeder U.S. Pat. No. 1,901,416 to absorb at pressures markedly above atmospheric and strip at about atmospheric pressure. The broad idea of stripping with a fixed gas is also described in the Stotler U.S. Pat. No. 3,225,519 but for another process. With dilute $SO_2$ gases large volumes must be dealt with, and to be practically useful a process must be of moderate cost.

An improvement on the general method of removing $SO_2$ by desorbing with a gas forms the subject matter of the Gunther application Ser. No. 152,232, filed June 11, 1971, which was a continuation-in-part of Ser. No. 132,752, filed Apr. 9, 1971, which in turn was a continuation-in-part of Ser. No. 860,183, filed Aug. 13, 1969. The last three applications are now abandoned. This process effects a very great economic improvement over the U.S. Pat. No. 1,901,416 by absorbing $SO_2$ at pressures not significantly above ambient and desorbing with a fixed gas under vacuum. A greatly reduced power cost is effected, e.g., one-thirtieth or less of that required in the Schroeder process, because of the much lower weight of the gases to be handled.

The Gunther process referred to above is not limited to use of air as a desorbing gas. It is possible to use any other fixed gas suitable to the ultimate disposal of the desorbed $SO_2$. For example, a reducing gas such as methane is a suitable desorbing gas when the $SO_2$ is to be reduced to elemental sulfur. In the desorption water vapor is always present in the overhead gas from the desorption.

The use of a fixed gas in desorption serves an additional purpose when, owing to pneumatic resistance in packed desorption towers or hydrostatic pressure in plate columns, there is a considerable pressure drop from the bottom to the top of the column. This pressure drop is most significant in those systems in which the total pressure is only slightly greater than the partial pressure of water vapor. The effect of the pressure drop is to produce a variation in the mass flow rate of gas along the length of the column and a reduction of the efficiency of stripping, sometimes to the extent that a separation which is feasible in the absence of a pressure drop in the column becomes impossible to achieve under conditions in which such a pressure drop exists. Inasmuch as such a pressure drop is normally encountered when a column is operated at a capacity which is required by process economics, this constitutes a substantial limitation. The process requires a large amount of stripping gas, as will be described below.

The present invention overcomes the limitations mentioned and represents a great saving because it permits operating with low volume of fixed stripping gas below about 10 parts per part of $SO_2$.

To illustrate, if the total pressure at the bottom of the column is $\pi$ and the partial pressures are $p_w$ and $p_f$ for water and fixed gases respectively, $\pi = p_w + p_f$.

A change in $\pi$ by an amount $\Delta\pi$ results in an equal change, $\Delta p_f$ in the fixed gas partial pressure $p_f$, inasmuch as $p_w$ does not change with pressure. If $p_f$ is a small fraction of $p_w$ it is possible to produce, with a small percentage change $\Delta\pi/\pi$, a much larger percentage change $\Delta p_f/p_f$ in the fixed gas partial pressure.

This implies that as the gas rises in the column an increasing fraction of the mass is that of water vapor, so that the total mass flow increases as the gas moves upward. The effect of this is detrimental to column efficiency, as is shown graphically in FIG. 1. In this figure the abscissa represents the composition of the liquid and the ordinate represents the composition of a corresponding vapor, both expressed as mol percent of $SO_2$. The liquid-vapor equilibrium is represented by the equilibrium line OA where there is no pressure drop along the column and no appreciable change in gas volume.

Employing the McCabe-Thiele method of column design, and subject to the same assumptions of constant gas volume flow, the operating line for the system is represented by $X_oY_o$. For a plate column this represents the relation of the composition of vapor entering the plate from below to the composition of the liquid entering the plate from above. The mass balance requires that a change in the one corresponds with a proportionate change in the other. This requirement is equivalent to specifying that the operating line $X_oY_o$ be a straight line provided that the flows of gas and liquid are constant along the column.

Adopting the McCabe-Thiele method of design the number of theoretical plates is obtained by stepwise progression between the operating line and the equilibrium line as shown in FIG. 1. In the example represented in this figure there are approximately 5-½ of such steps indicating this number of theoretical plates. In an actual plate column there are slightly more than this number by virtue of the failure to achieve perfect equilibrium between the phases at each plate. In the case of a packed tower there is a height at column which is equivalent to each theoretical plate of a plate column.

The operating line is straight, as shown in FIG. 1, if the mass flow of gas remains constant, as is the case if the pressure and temperature remain constant throughout the column. The terminal point of this line, $X_o$, represents the concentration in the stripped solution leaving the column, and the other terminal point, $Y_o$ or $Y''_o$ represents the composition of the overhead gas stream leaving the column, the liquid entering the top of the column having the composition $X_2$.

The operating line under actual practical conditions involving a pressure drop along the column becomes modified from the straight line $X_oY''_o$ to the dashed curved line $X_oY'Y_o$ and the operating line now crosses the equilibrium line so that the system is no longer operable. Under these conditions of pressure drop in the prior art there is no alternative but to employ a greater amount of stripping gas so that the operating line approaches closer to the X-axis, as shown by the line $X_oY''_o$, which is the operating line under these modified conditions.

The penalty which results from this modification is the use of a larger quantity of steam and fixed stripping gas and this is reflected in a greater amount of process heat or power requirement as a result of the reduction of the $SO_2$ mole ratio in the overhead gas from the stripper. This ratio, Y, is expressed by the following:

$$Y = \pi - p_w/\alpha(X_i - X_o/X - X_o)\pi + p_w$$

where X is the $SO_2$ mol ratio in the liquid at any point in the column, $X_i$ and $X_o$ are the $SO_2$ mol ratio in the liquid in and out of the column, and $\alpha$ is the ratio of the molal flow rates of stripping gas to the $SO_2$ gas in the gas phase overhead from the column.

This represents the operating line as a function of the principal parameters. This equilibrium line is given by $$Y = H X/\pi - H X$$

where H is the Henry's Law constant for $SO_2$ in water. The number of theoretical stages is obtained from these two equations for the equilibrium line and the operating line of this system in accordance with the prior art.

This is shown in FIG. 2 for the following selected conditions in an example of the prior art.
$\pi = 27.27$ mm
$P_w = 26.27$ mm at 80°F.
initial pH = 3
$\alpha = 0.435$ Under these conditions the operating line at maximum possible slope is one for which $X_o = 2.5 \times 10^{-4}$ mole ratio, and this represents the minimum $SO_2$ content which can be achieved in the solution bottoms leaving the column. In the method of the prior art the only way to improve on this is to utilize more fixed gas for stripping or else to reduce the operating pressure, $\pi$. Accordingly, curve B represents another operating line at a lower total pressure, $\pi = 26.25$ mm, and the system then requires two theoretical plates as shown in the figure. For the actual situation in a packed column in which there is a pressure drop we have in FIG. 2, curve C which crosses the operating line indicating the impossibility of mass transfer under the specified conditions. This is indicated by the following illustrative example of the prior art:

The tower for stripping is operated with 3-½ inches Pall rings at a liquid loading of 20,000 lb/(hr) (sq ft) and with an initial gas loading of 950 lb/(hr)(sq ft). Under these operating conditions the pressure drop is 0.2 mm Hg per ft of tower height and the HTU is 3 ft. The total pressure is 27.27 mm in the overhead vapor. The $SO_2$ concentration overhead is 0.01 mole fract.

At a depth of 3 ft. below the top of the tower the pressure is 27.25 mm. This means that, with a water vapor partial pressure, $p_w = 26.27$ mm at 80° F. the partial pressure of the fixed gases is $27.25 - 26.27 = 0.98$ mm. The column cannot operate under these conditions.

SUMMARY OF THE INVENTION

The present invention is an improvement on the Gunther process referred to above as it permits operating with much less stripping gas, and it is under such conditions that the advantages of the present invention are obtained. With very large amounts of fixed stripping gas, ratio gas/$SO_2$ of greater than 10, it is possible to operate without the use of the present invention, as can be seen from the bottom line $X_oY''_o$ in FIG. 1, using an excessive amount of stripping gas, and it is the avoiding of this penalty which is an important feature of the present invention. Even though theoretically the prior art can be made to work with a very large amount of stripping gas, sometimes such a large amount is not available, for example if the product requires a certain minimum concentration of $SO_2$. In such a case the prior art will not work because the product dictates the use of a smaller amount of stripping gas.

Essentially the process of the present invention uses two or more separate absorption sections for absorbing the $SO_2$ in water, paired with an equal number of stripping sections, the latter at sub-atmospheric pressures. In each paired set, a stage at absorption is paired with a stage of stripping. This is accomplished by recirculating of the water stream between the corresponding paired stages so that $SO_2$-enriched water from an absorber section passes through the corresponding stripper section and stripped solution reenters the same absorber section.

Ordinarily two sections of absorption and stripping are adequate and will be described further below in conjunction with the preferred embodiments, which deal, as an illustration, with a dilute gas. With stronger gases from other sources where the problem is to meet a low absorber off gas content because of pollution legislation, a larger number of paired sections, such as three or even more, may be necessary.

When multiple stages are used, even with a small amount of stripping gas, <10 per part of $SO_2$, an operating line, as shown for each stage in FIGS. 3 and 4, is calculated from the equations on page 7. The actual ratio of gas, in this case $CH_4$, to $SO_2$, 195/447, is 0.436, i.e., very much less than the useful limits of the present invention set out above. Even with this extremely low stripping gas/$SO_2$ ratio the operating line does not cross the equilibrium line, and of course the savings in costs are very great.

The invention will be described generally in connection with a somewhat simplified illustration in FIG. 6. The elements will be given the same reference numerals as in the more detailed drawings, FIGS. 5A to 5D, which will be described in a later section of the specification dealing with the description of preferred embodiments. A gas stream containing dilute $SO_2$ enters the first section 6 of an absorber, and rising to the top of this section and thence into the second section 7 barren gas containing much less $SO_2$, for example only one-tenth as much, is vented to the atmosphere, as shown by the line with an arrow. As will be described in the preferred embodiments, this venting is effected with other necessary provisions. However, FIG. 6 is essentially a simplified, generally diagrammatic presentation, and the various lines for gas and liquid are shown at the point where they enter or leave the equipment without illustrating any actual conduits. The first section 6 receives a partially stripped water solution of $SO_2$ from the first section 11 of a stripper, the liquid from the stripper being pumped as shown by the pump 40. As the stripper is operated at a lower pressure than the absorber, the solution of $SO_2$ in the first section 6 of the absorber flows into the first section 11 of the stripper through the lines in the direction shown by the arrows. Stripping gas is introduced into the section 11 as indicated by the arrow. The first section of the stripper in the simplified Figure 6 is shown as a single section.

The stripping gas then flows up into a second stripping section 12, stripping the $SO_2$ and producing a still more dilute aqueous solution of $SO_2$, which is pumped by the pump 41 into the second section 7 of the absorber. Liquid collects in the trough 39, being prevented from flowing down into the section 6 by the baffle 38. As the absorber is at atmospheric pressure and the second section of the stripper 12 is at sub-atmospheric pressure, the liquid from the trough 39 flows into the second stripper section, as is shown by the lines with arrows.

The overhead gas streams from the stripper sections 11 and 12 containing higher concentration of $SO_2$ than in the original stream 1 are delivered at atmospheric pressure by the compressors 33 and 34. After passing through condensers 22 and 23, the fixed gases, including stripping gas and $SO_2$, leave in streams 42 and 43.

There are, of course, numerous modifications which may be made within the scope of this invention. For example, it may be desirable to include provision for the removal of carbon dioxide, nitrogen and oxygen from the solutions going to the stripper, especially when the recovered $SO_2$ is to be converted into brimstone. It may also be advisable to compress in stages the overhead gas from the stripper sections and to condense a part of the water vapor between compression stages. Finally, it may be advantageous to combine stages of compression of the overhead gas streams.

In the stripping of aqueous solutions of sulfur dioxide at reduced pressure and in the stripping of any other gas under conditions of temperature and concentration at which the vapor pressure of water is considerably greater than the partial pressure of the gas which is to be stripped the stripping is accompanied by a cooling effect. This effect is a consequence of the latent heat of evaporation of the water which is released with the gas.

For the subsequent recovery of the gas which is removed by stripping it is necessary to remove the water vapor by cooling the gas and vapor mixture under conditions at which this water vapor is condensed. Moreover, the cooling effect in the stripping results in a reduced gas partial pressure with consequently greater difficulty and power requirement for compression from the reduced pressure of the stripper.

The heat which must be removed to condense the vapor from the stripping is almost the same as the heat which has to be added to the stripper solution to maintain its temperature. In the stripping practice of the prior art heat was added to the solution, as by using steam heating coils and the same amount of heat was removed from the condenser. One of the purposes of this invention is to bring the stripper solution and the vapor condenser into heat exchange relation so that the heat which is required to overcome the cooling effect of stripping is furnished by the vapor condensation in the condenser. Many solutions in stripping operations are corrosive to metals and it is a further object to achieve the heat exchange relation by direct contact without the requirement of a heat transfer surface.

It will be noted that the condensation of water vapor which is cooled by direct heat exchange contact there can be a problem where absorber liquids are used because other dissolved gases are present, such as, for example, in stack gases, $CO_2$. Such a gas is not desirable in concentrated $SO_2$, and so in such cases there is an advantage of drawing the cooling liquid from stripper section instead of from absorber section. When the condensation is used in conjunction with an overall preferred embodiment where solutions are recycled between paired sections of absorber and stripper, this makes it very easy to choose whether cool liquid from stripper or absorber stages is to be used, and the preferred combination, therefore, presents additional flexibility. It should be noted that if the problem of other absorbed gases, such as $CO_2$ does not arise, there may be an advantage in using liquid from absorber section because it contains higher concentrations of dissolved gas, and so that condenser, which performs the heat exchange, may be utilized for part of the stripping duty. The particular choice is dictated by the most advantageous economical operation.

Flow rates of water as an absorbent for sulfur dioxide in the range of concentration in the gases from power plants is substantially decreased when cooled below the wet bulb temperature of the gas. This presents a problem which is solved by another subsidiary feature of the present invention.

In the prior art it has been considered impractical to reduce feed gas temperatures to absorbers to very much less than the temperature which is reached by adiabatic cooling with water, that is to say, the wet bulb temperature, usually 125° – 135° F. If it is attempted to cool below this temperature with indirect cooling, this is very expensive because of the highly corrosive gases. Fixed gases are removed by the coolant, which is in direct heat exchange to a large extent, thus degassing the coolant. A very practical method and apparatus is described in conjunction with FIG. 5A, but this subsidiary feature is not limited to the exact means shown and other degassing means may be used. The degassed coolant can be dropped in temperature by self-evaporation in cooling towers and recycling without involving pollution problems. The subsidiary feature of the present invention of cooling described in the preferred embodiments for $SO_2$ is also applicable to any other noxious gases which are to be removed by absorption.

In the recycle of the aqueous solutions between the paired sections of absorption and stripping there is a build-up of sulfuric acid, mainly from the $SO_3$ present in the flue gas. Unless this is controlled by means of a bleed off and/or neutralization there is a decreased efficiency of absorption owing to the effect of sulfuric acid in reducing the solubility of $SO_2$. There is, of course, a corresponding improvement in the efficiency of desorption so that the presence of a moderate concentration is not disadvantageous in its overall effect. Owing to the fact that the corresponding effects on efficiency are dependent on the $SO_2$ concentration, the preferred concentrations of sulfuric acid are higher in the second section solutions than in the first. In a typical case in which the gas entering the system contains 0.2 per cent $SO_2$ and in which 90 per cent is absorbed, the preferred concentrations of fixed acid are the ones that give a pH of 3 for the first section and a pH of 2 for the second section. The fixed stripping gas may be air, which is often preferred, or any other fixed stripping gas, such as a reducing gas, methane, which is illustrated in connection with FIGS. 3, 4 and 5A to 5D.

BRIEF DESCRIPTION OF THE DRAWINGS

FIGS. 5A to 5D are a semi-diagrammatic representation of a complete plant, and

DESCRIPTION OF THE PREFERRED EMBODIMENTS

Figure 1:
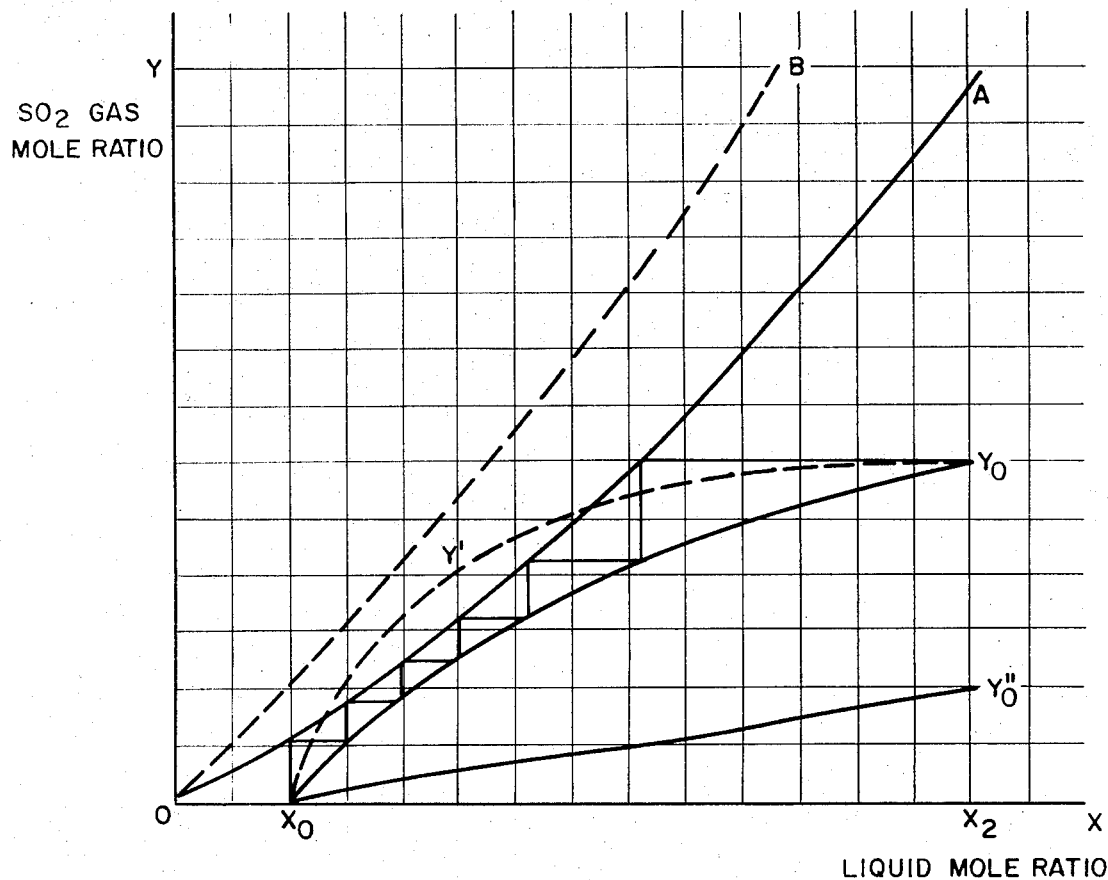
FIGS. 1 and 2 are curves of equilibrium and operating lines of modifications of single units in the prior art.
Figure 2:
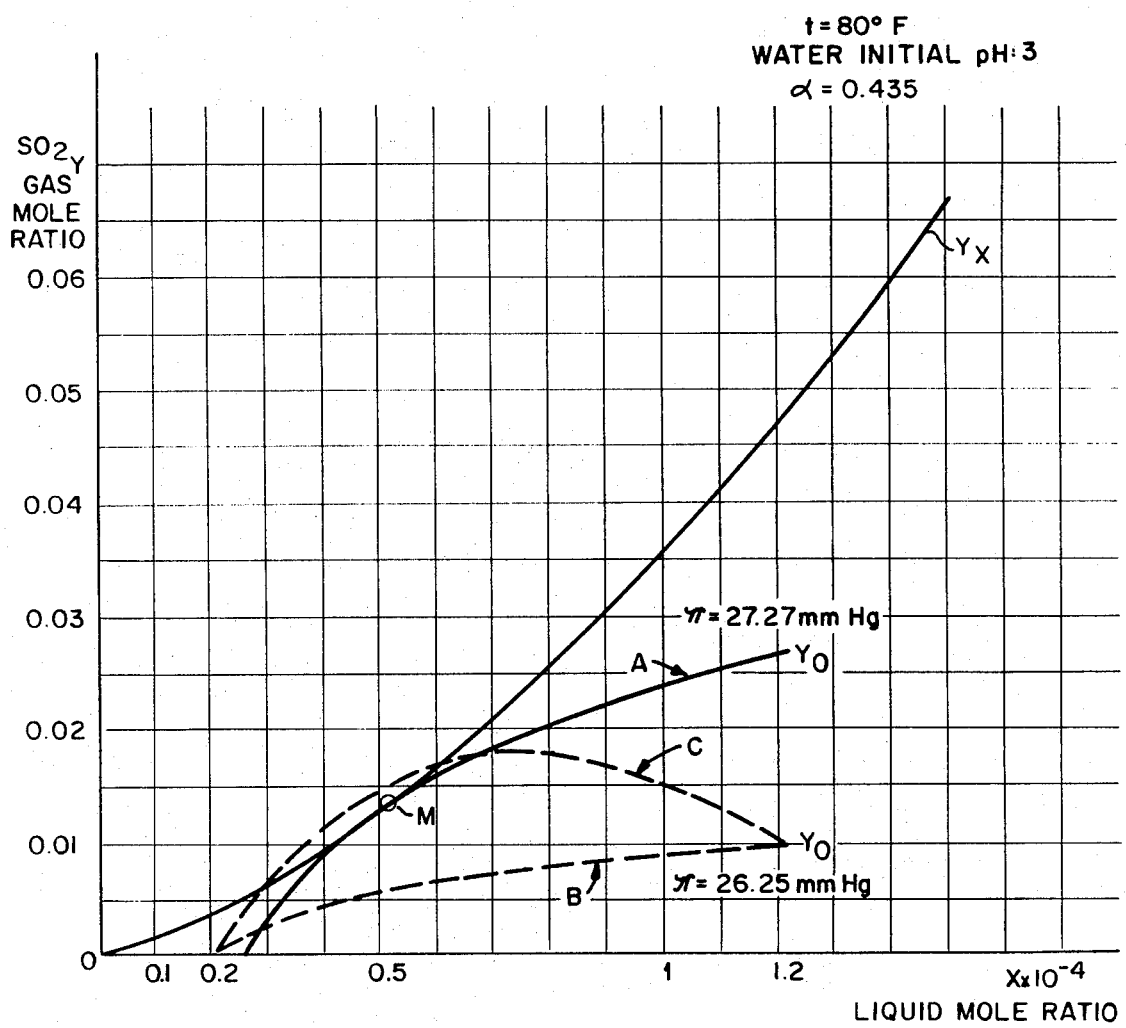

FIGS. 5A to 5D represent, in semi-diagrammatic form, a system in accordance with the present invention in which there are two paired sets of sections of absorption and stripping and in which each section of stripping is further divided into two sub-sections. The drawings represent recovery of $SO_2$ from a large power plant using methane as the stripper gas. The stripped gas is then transformed into sulfur in a conventional plant (30), which is shown purely diagrammatically. On the drawings certain abbreviations are used: $mf$ for mol fraction, $\pi$ for sub-atmospheric pressures, $r$ for ratio of compression, CLT for cooling tower, etc. All temperatures are in degrees Fahrenheit, and 1 lb. mol occupies 380 scf under standard conditions. In order to simplify the drawings all of the compressors are shown driven by steam turbines, but, as will be pointed out below, if desired a portion of the compressing power can be derived from expansion of the stripping gas, $CH_4$, through expansion turbines to the lower pressure in the stripper sections.

As shown in FIG. 5A a stream of flue gases 1 is cooled by water spray, scrubbed in a particulate matter scrubber 2, the particulate matter being settled in a thickener or settler 3, underflow pumped away and overflow recirculated into the particulate matter scrubber. The scrubbed gas is then further cooled in a gas cooling tower 4 and the cooled gas blown through a main gas blower into the absorber 5, as will be described below. Since the gas cooling tower utilizes a spray of water, some $SO_2$ and $CO_2$ are dissolved and are flashed in a flash pot 28 with a condenser 29, both operating at sub-atmospheric pressure from a steam injection vacuum pump 32. Condensed water goes into a hot well 31 and is cooled and pumped off as makeup water, as indicated. The above operation effects feed gas cooling, as has been described more generally above. The degassing at sub-atmospheric pressures in the flash pot 28 and condenser 29 permits water cooling in an ordinary cooling tower, as indicated on the drawings, where cooling is by evaporation; and since the water has been degassed, no pollution problems from the cooling tower result. The gases, such as $SO_2$ and $CO_2$ are shown as being returned to the main inlet gas stream from the main gas blower.

Figure 5B:
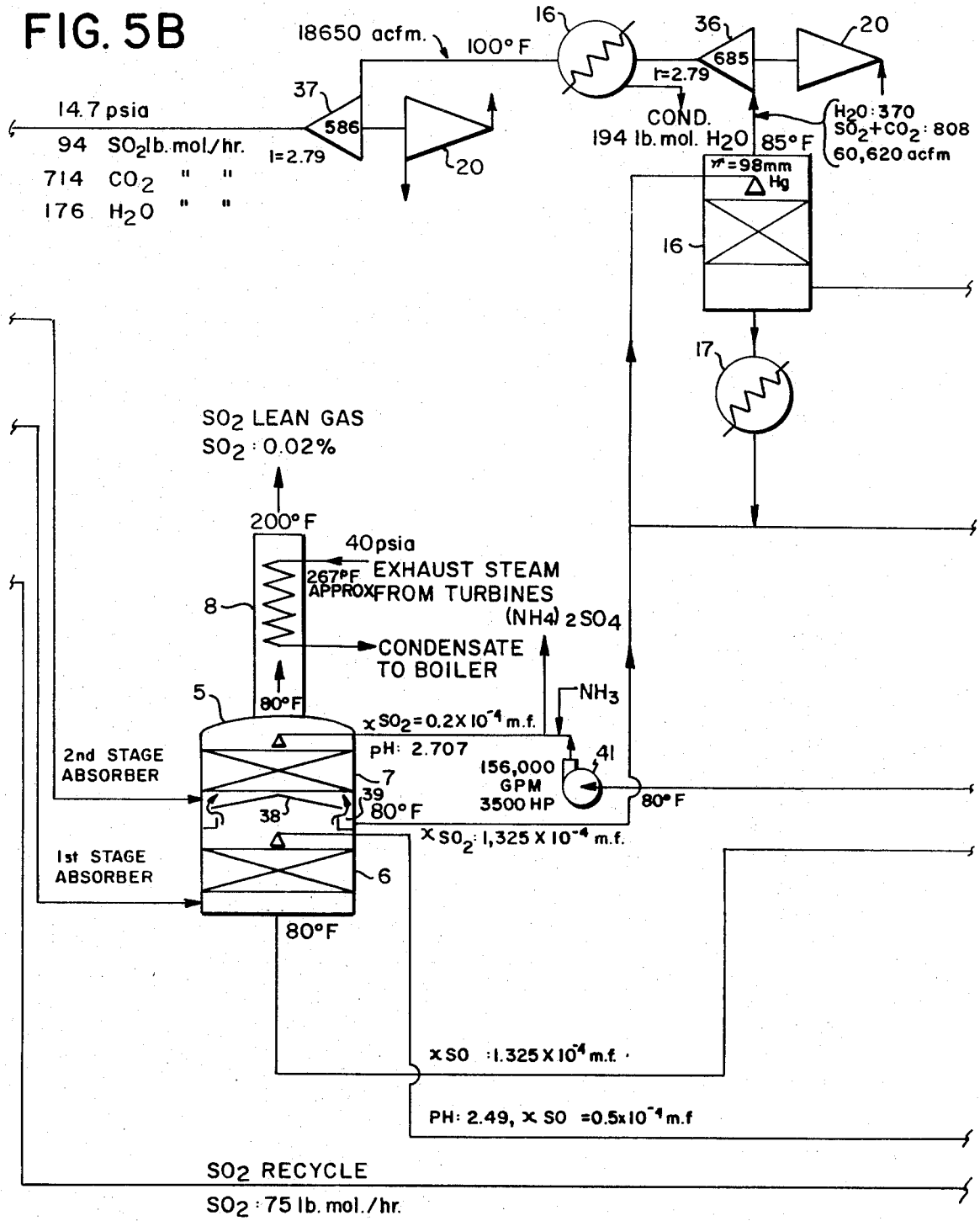
Figure 5C:
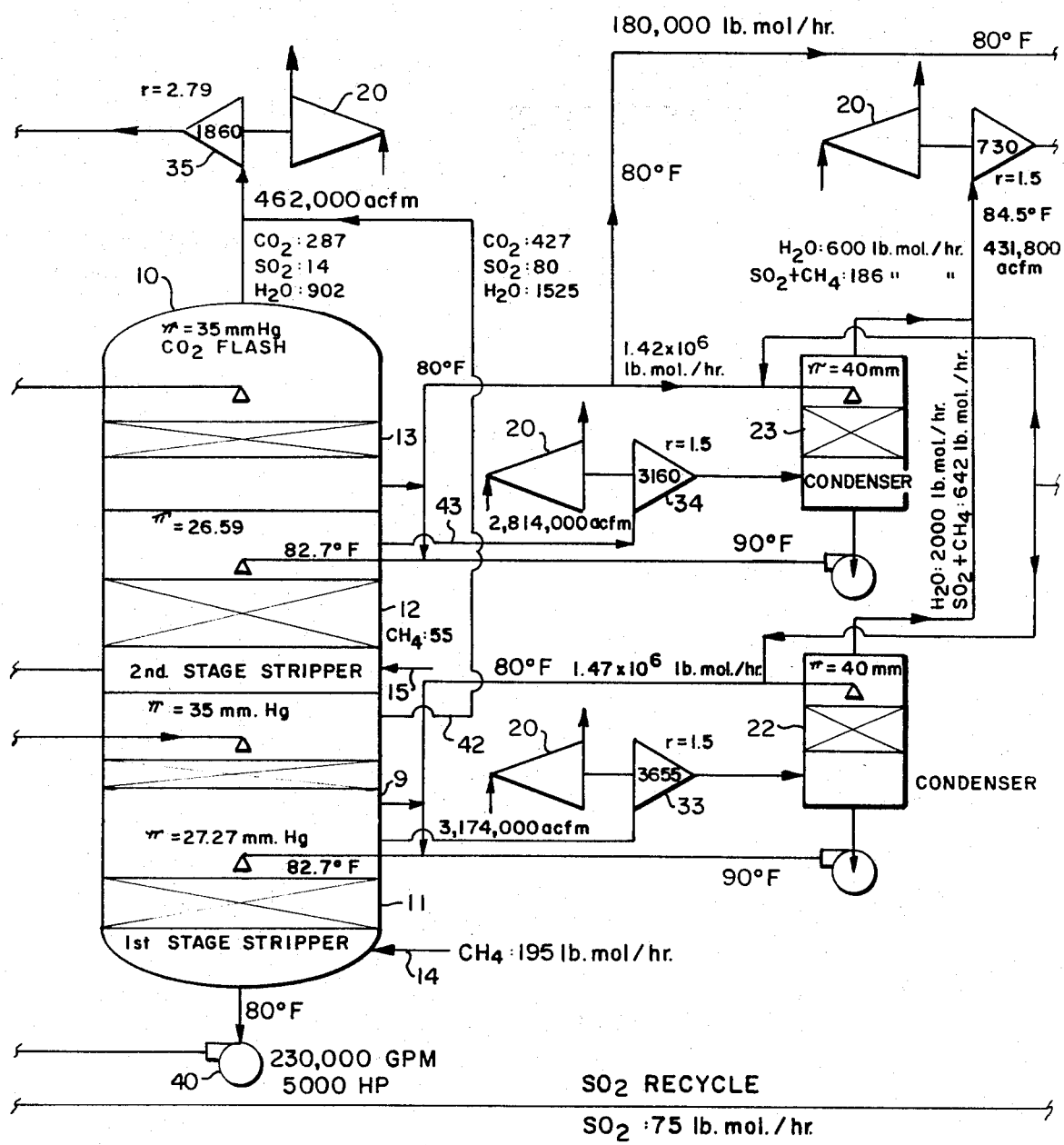
Figure 5D:
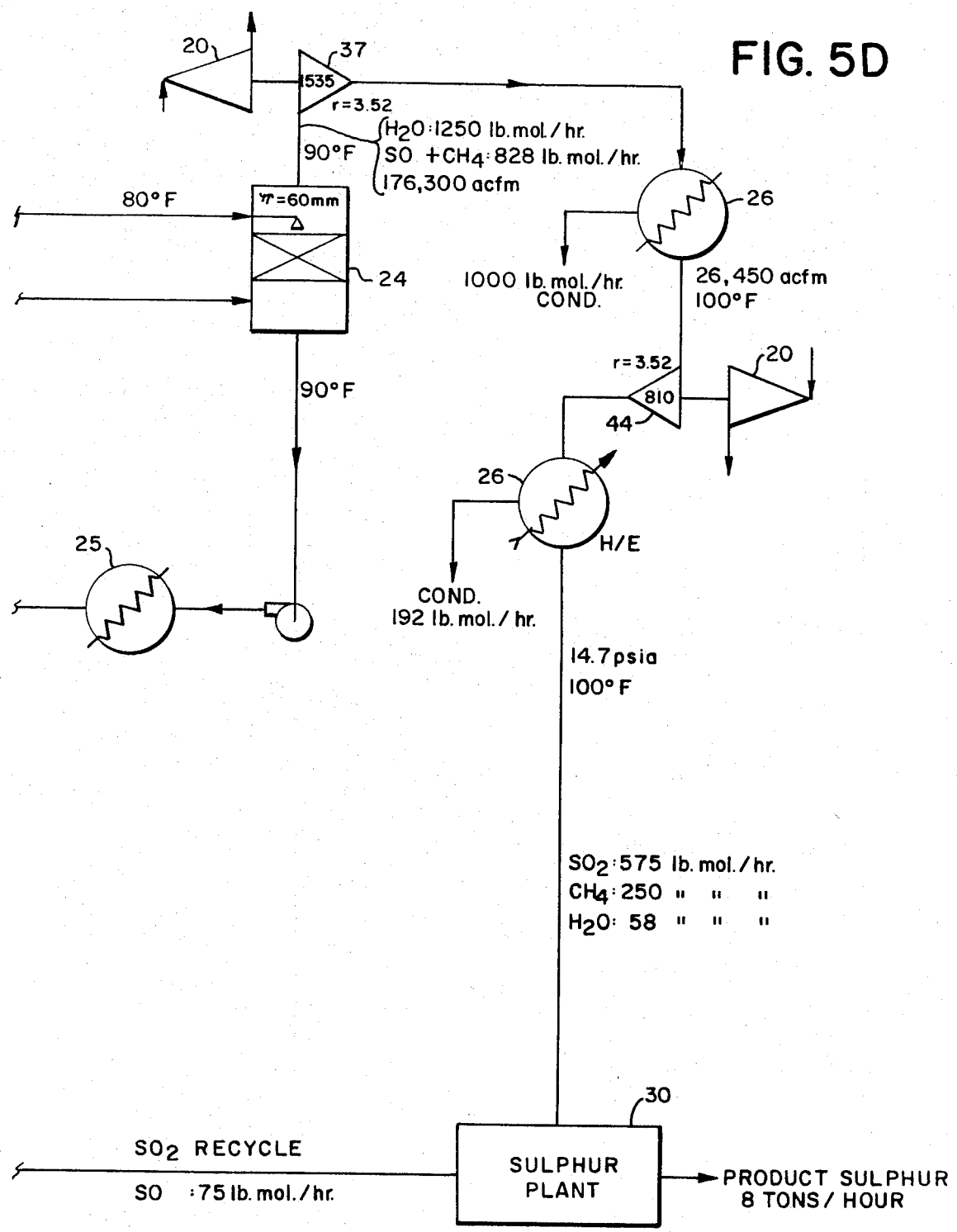
Figure 6:
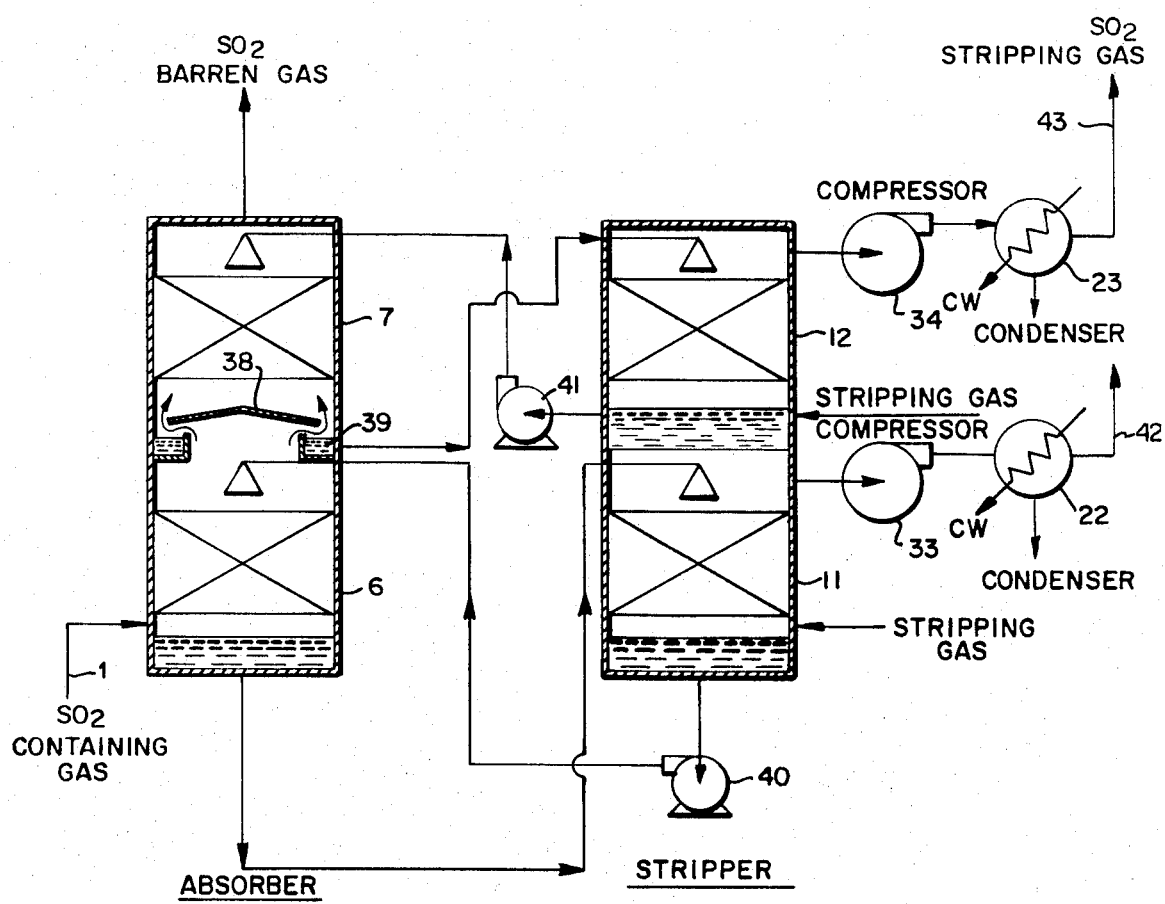
FIG. 6 is a simplified diagrammatic illustration.

The absorber 5 shown in FIG. 5B is made up of a first section 6 and a second section 7 through which the gas passes in series. The absorber sections, as will be the case in the stripper which will be described below, are shown diagrammatically and may be of any standard design, such as, for example, packed towers. There are sprays of liquid in section one 6 and section two 7 coming from the first section of the stripper and the second section stripper, respectively. Off gas leaving the second section of the absorber 7 is heated up somewhat by exhaust steam from turbines in a heating zone 8. The exhaust steam comes from turbines 20, shown as driving the various compressors, and condensate flows back to the boiler. The lean gas leaving has an $SO_2$ content of 0.02 percent; in other words, its concentration has been reduced by a factor of ten. At this concentration it meets with the requirements for release to the atmosphere. The heating of the off gas performs the necessary function of providing adequate draft in an off gas stack and also discharges at a sufficient temperature so that the off gases will not tend to sink to the ground, as even with the reduced $SO_2$ content this would be undesirable. The requirement for adequate temperature of off gases is something which has been known and is not, therefore, the distinction of the present invention from the prior art. However, it will be noted that by using the exhaust steam from the compressor turbines for this heat, no additional fuel is consumed as this exhaust steam represents waste heat. In the drawing all the turbines are shown as steam driven, and usually this is desirable even if expansion of $CH_4$ stripping gases through turbines could supply a part of the compressor power. Of course the invention is not primarily concerned with the particular power source used for recompressing gases from the various stripper sections, but it is preferred to use steam turbines so that their waste heat can be used for the necessary heat of the absorber off gases.

The water solution of $SO_2$ and other soluble gases, such as $CO_2$, from the bottom of the absorber first section 6 is introduced as a spray into the second sub-section 9 of the first stripper section. The stripper sections, (FIG. 5C), are all in a column 10 but are separated from each other except through their recycle, which will be described. It will be noted that the two sub-sections 9 and 11 of the first section of the stripper, which are operated at sub atmospheric pressures, result in partial stripping of the aqueous solutions of sulfur dioxide, and this partially stripped liquid is used as the absorber spray in the first absorber section 6. This is the first pairing of stripper sections and absorber sections which constitutes one of the major features of the present invention.

After having had a considerable portion of the $SO_2$ dissolved in the first absorber section the gas passes through the second section 7 of the absorber and, as has been described, is then finally exhausted to the air with its very low $SO_2$ concentration. The water spray in the second absorber section 7 comes from the bottom sub-section of the second stripper section 12, and this constitutes the second pairing of stripper and absorber sections.

Gases 42 from the smaller second sub-section 9 of the first stripper section formed of sub-sections 9 and 11 flows out and is split into two streams; one of them goes to a spray in sub-section 11 and the other into a condenser 22. The stripped gases from the bottom sub-section 11 of the first stripper section are compressed by compressor 33, which is of low ratio of compression, and flow into condenser 22, where at the higher pressure some water containing some $SO_2$ is condensed out and, as has been stated, is recirculated to form part of the spray in the lower sub-section 11 of the first section of the stripper. In this sub-section there is introduced the major portion of the stripping gas, $CH_2$, which comes in the line 14. Some of the water and $CO_2$ from the upper sub-section 9 flashes off and joins flashed $CO_2$ from the second stripper section, as will be described. Some $SO_2$ also flashes, but much less than the amount of $CO_2$.

The multiple sections of stripping permit an additional advantage as the introduction of $CH_4$ can be in separate sub-sections, which permits operating each stripping section with the optimum concentration of $CH_4$. This is illustrated on the drawing by introducing a somewhat smaller portion of $CH_4$ into the second through the line 15 into the lower sub-section 12 of the second section of the stripper. As has been described above, the stripped liquid from the second stage is used as the spray for the second absorber stage 7. The stripped gases 43 from the lower sub-section 12 of the second stripper section are compressed slightly by the compressor 34 and are condensed in the condenser 23. This condensate is pumped back as a spray in the aqueous solution of $SO_2$ from the second absorber section 7, goes partly to a spray in the upper sub-section 13 of the second section of the stripper and partly to the element 16. This second section and top sub-section 13 primarily effect a flashing of $CO_2$. It will be noted that the flashing of $CO_2$ here as well as from the upper sub-section 9 of the first section of the stripper is at a higher pressure than the actual stripping sub-sections 11 and 12. The liquid from the sub-section 13 from which $CO_2$ has flashed is split, part of it joining a spray into the section 12, which comes from the condenser 23, as has been described, and part of it as a spray in this condenser and in an additional condenser 24, which will be described.

The gases containing flashed $CO_2$ from the sub-section 13 of the stripper are compressed somewhat in the compressor 35 and introduced into the element 16, which has also received some of the $SO_2$ solution from the second absorber section 7. The liquid flowing out of this element, which is at a slightly higher temperature because of the compression in the compressor 35, is then cooled in the cooler 7 and joins the main stream of the aqueous solution from the second absorber section 7, which sprays into the upper sub-section 13. Gases from the element 16 are compressed somewhat further in compressor 36, water condensed out in the condenser 18, and the gases then further compressed to ambient in the compressor 37. These gases are then recycled into the first and second sections of the absorber.

It will be noted that the stripped liquid, which is very low in $SO_2$ and which is pumped by pump 41 as a spray into the second section 7 of the absorber, receives some ammonia and purges some ammonium sulfate. This is shown on FIG. 5B and effects a neutralization of excess acidity caused by the fact that the gases entering at 1 contain a small amount of $SO_3$. This amount is too small to be worth indicating on the flue gas composition, which is set forth at the top of FIG. 5A, but it is sufficient so that the pH of the whole system would otherwise steadily fall as the sulfuric acid builds up since this is not stripped in the stripper. The addition of ammonia neutralizes this excess acidity, and the purge of ammonium sulfate keeps the circulating load of this salt down to the point where it does not interfere with the operation of the process of the present invention. The change in pH by the addition of ammonia is not very great, and therefore the pH of 2.707 going into the section 7 of the absorber is only a little higher than the pH in section 12 of the stripper. It is an advantage of the present invention that reasonable control of pH for the whole system can be effected at a single point, which simplifies operation.

The vapor stream from the sub-section 11, of the stripper is compressed by compressor, 33, and is then piped to a condenser, 22, which is cooled by a stream of the stripper solution from sub-section 9 which is heated by the condensation of vapor. The ratio of compression is such that the vapor condensation temperature is brought substantially above the temperature of the solution from the stripper so that there is temperature differential which is adequate for a practical rate of heat transfer and of condensation. The condensate with some of the stripped gas is thereby returned to the solution from the stripper.

The stripper solution, in accordance with the earlier aspect of this invention, is recycled between paired sections of the absorber and stripper. Accordingly, it is possible to circulate solution to the condenser from either a stripper section or from its paired section of the absorber and it is possible to return the heated solution from the condenser to either the stripper or absorber sections. Inasmuch as the absorber section solution contains the higher concentration of dissolved gas it may be preferable to use this solution in the condenser and thereby utilize the condenser for part of the stripping duty. However, in the recovery of $SO_2$ from power plant stack gases the solution from the absorber section may contain a considerable concentration of $CO_2$, a part of which is released in the condenser if the condenser coolant is taken from the absorber stage. Inasmuch as $CO_2$ is not a desirable component of the concentrated $SO_2$ stream it is better in this case to draw the condenser coolant from the stripper section.

The gases from condensers 22 and 23 are joined, compressed, and after moderate compression introducted into a sub-atmospheric scrubber 24 which is fed with a spray of liquid coming from the stripper section 13. The liquid at moderate temperature is then pumped through a cooler 25 and joins some of the liquid from the stripper 13 to spray into the condenser 23.

The gases from the scrubber 24 are compressed in the compressor 37 and fed to the condenser 26 where a considerable amount of water is condensed out. After passing through the condenser 26 the gases are compressed to a higher pressure, substantially ambient, in compressor 44. They then pass through a second condenser, which is also labeled 26, to condense out some further amounts of water. The gas is now at ambient and passes into a sulfur plant 30. This plant is of more or less standard design for a modified Claus process, the modifications merely being to suit a particular gas entering the plant, which has the composition shown on the drawings. From the modified Claus plant, the sulfur produced is recovered as a product as indicated. As there is a deficit of $CH_4$ over $SO_2$, some of the latter leaves the sulfur plant and is shown as recycled into the line passing into the first absorber section 6. This $SO_2$ is, therefore, not lost, and the smaller amount of methane stripping gas which effects a marked economy in the process and increases operating reliability is not offset by $SO_2$ losses.

The off gases from the sulfur plant, as is usual, consist of inert gases together with the small amounts of $SO_2$, which have been referred to above, and some $H_2S$, $COS$ and $CS_2$. The excess of $SO_2$ in the sulfur plant, which is recycled as has been described above, minimizes the content of $COS$, $H_2S$ and $CS_2$ in the off gas to a point where they are relatively insignificant.

Figure 3:
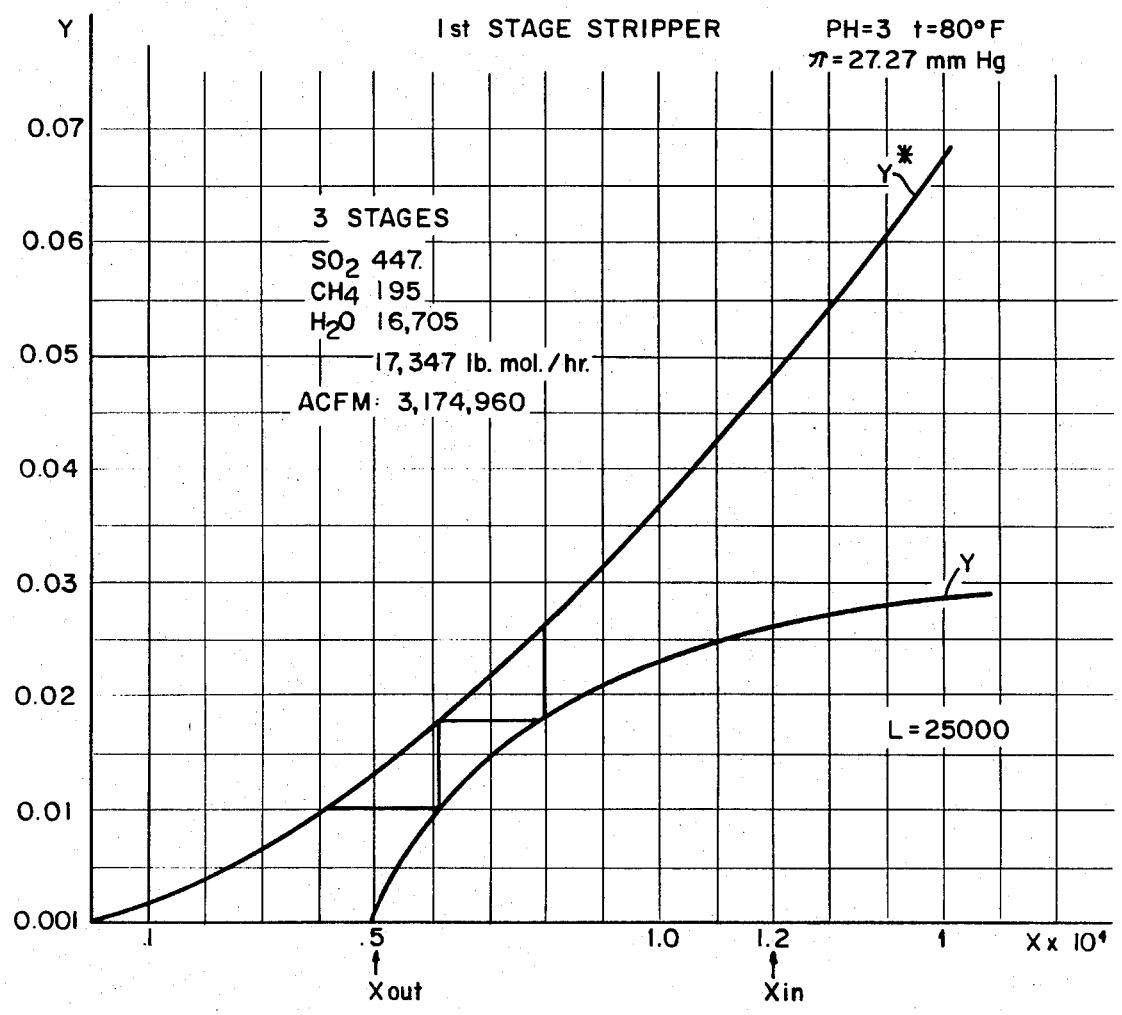
FIG. 3 are equilibrium operating line curves of a first stage stripper.
Figure 4:
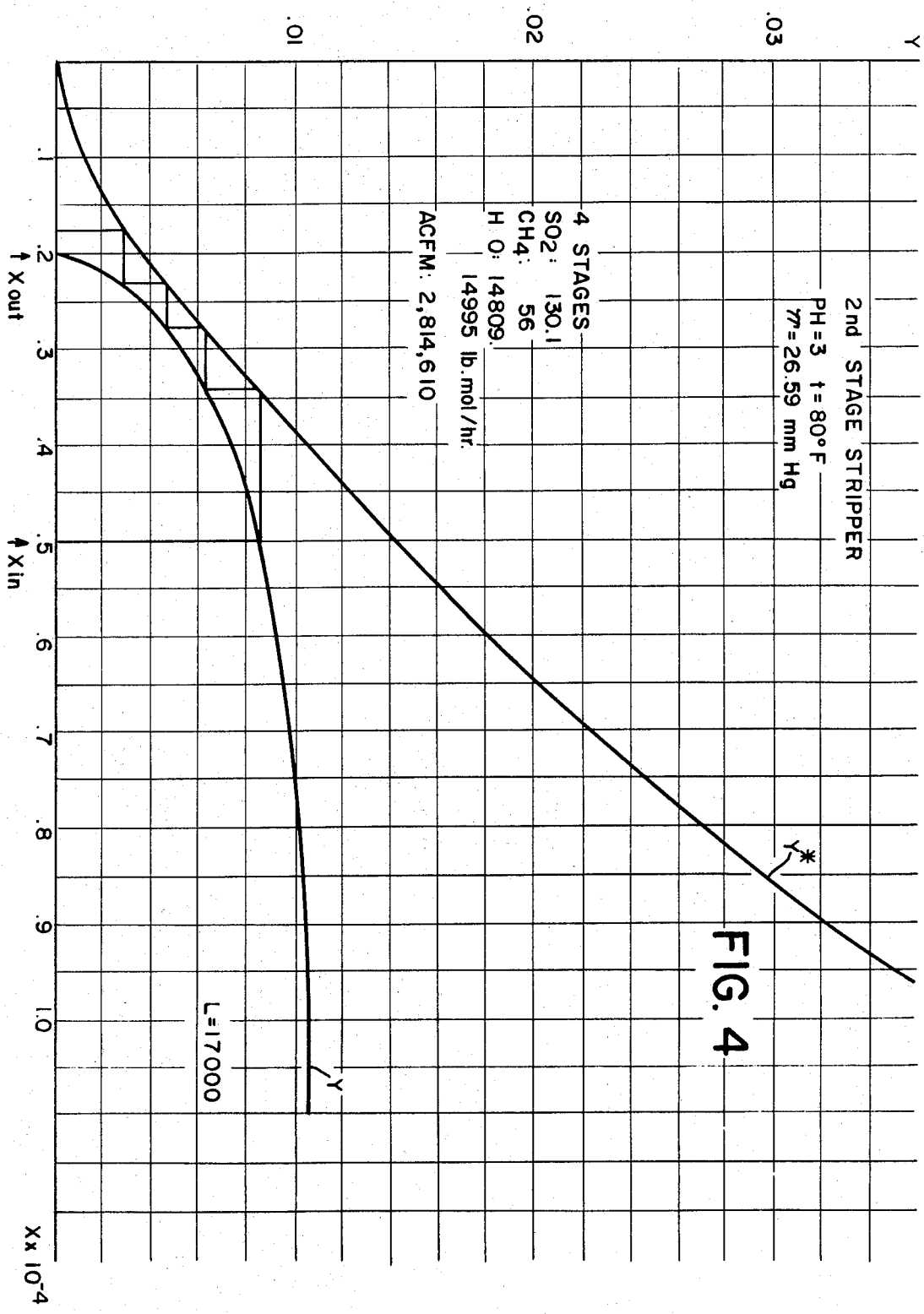
FIG. 4 are similar curves for a second stage stripper.

It will be noted from a consideration of FIGS. 3 and 4 that fewer transfer units can be used with two paired sections of absorption and stripping and that the system can function despite a finite pressure drop in the absorber which could otherwise render single section operation of absorber and stripper inoperative or at least excessively critical to control if the same small amount of $CH_4$ had been used in the prior single absorber and single stripper processes.

FIGS. 5A to D show a system in which there are two absorber sections and two stripper sections with pairing. It will be apparent that there can be more than two sections but in most practical plants handling stack gases the somewhat greater reduction of $SO_2$ content obtained by more sections is outweighed by the greater complexity of the system and hence its higher cost.

As has been stated above, when the present invention is used with $SO_2$ gases having a much higher $SO_2$ content, more than two sections in the absorber and in the stripper are ordinarily desirable. Where it is necessary to meet off gas $SO_2$ content requirements of pollution control laws which require too low a concentration of $SO_2$ for practical production with systems using only two absorber sections and two stripping sections such multiple systems are, therefore, included in the present invention where the nature of the gas treated and the constraints on off gas composition make the use of a larger number of sections desirable.

It is an advantage of the invention that the particular design of contact between gas and liquid in the various sections is not critical, and any suitable type, such as packed tower, bubble cap towers, and the like, may be used.

The preferred split sub-sections in the stripping sections permits utilization of different pH's in the various liquid streams. This is an additional advantage as the higher the initial pH, for example substantially water only, the greater the solubility of $SO_2$ and the like. On the other hand, the stripping of $SO_2$ becomes increasingly difficult at higher pH's, and so it is usually desirable to have the second section of stripping operate at a somewhat lower pH than the first in order to facilitate stripping the very dilute $SO_2$ solution which is present at this point. It should be noted that in stripping there will be some change in pH, and so the reference above as to different pH's is to different pH's in each section and sub-section.

It has been shown above that the efficiency of stripping is a function of the absolute pressure, $\pi$, and the amount of stripping gas in relation to the amount of $SO_2$ to be recovered. On the other hand the use of excessively low pressure requires excessive compressor power consumption and the amount of stripping gas is determined by the process requirements. As noted above, the amount of stripping air when the $SO_2$ is to be converted to acid, is greater than the amount of methane when the $SO_2$ is to be reduced to sulfur.

In accordance with this invention, I control the compression ratios in the several compressor stages represented by compressors 19, 33, 34, 35, and 37. If these compressors are, as is shown, driven by steam turbines, the control of each compressor is by means of a throttle on each steam line. When this is done in combination with the control of the stripping gas flow into each section the system may be optimized with respect to efficiency and power consumption.

It should be noted, as has been pointed out above, that in the absorber sections there is a flow of the $SO_2$ containing gas in series through them. The stripper sub-sections however, are related to one another only through the recycle of the stripper solutions. Otherwise the stripper sub-sections are entirely independent of one another, which permits controlling the pressure to different values for different sub-sections. The independence of control is sometimes important in obtaining more complete separation of recovered $SO_2$ from other gases, such as, for example, $CO_2$ in stack gases.

I claim:
1. A process for $SO_2$ recovery from a gas in which
   a. $SO_2$ is absorbed in aqueous solutions in a sequence of absorption zones, said gas passing from zone to zone of absorption and therefrom to disposal,
   b. $SO_2$ is recovered from said aqueous solutions in a sequence of stripping zones with a fixed stripping gas for each stripping zone under vacuum, passing said stripping gas through each stripping zone to compression, and c. each of said aqueous solutions is recycled between a zone of absorption and a zone of stripping in corresponding sequence, each aqueous solution recycled from a stripping zone to an absorption zone being at least partially stripped.

2. A process of claim 1 in which the ratio of the fixed stripping gas to $SO_2$ is not more than 10.

* * * * *